(12) United States Patent
Sierak

(10) Patent No.: US 9,551,312 B2
(45) Date of Patent: Jan. 24, 2017

(54) APPARATUS FOR VOLTAGE DIP STABILIZATION IN A MOTOR VEHICLE

(71) Applicant: Flextronics International Kft., Ungarn (HU)

(72) Inventor: Thaddaus Sierak, Augsburg (DE)

(73) Assignee: Flextronics International Kft., Tab (HU)

( * ) Notice: Subject to any disclaimer, the term of this patent is extended or adjusted under 35 U.S.C. 154(b) by 0 days.

(21) Appl. No.: 14/379,666

(22) PCT Filed: Feb. 13, 2013

(86) PCT No.: PCT/EP2013/052832
§ 371 (c)(1),
(2) Date: Aug. 19, 2014

(87) PCT Pub. No.: WO2013/124191
PCT Pub. Date: Aug. 29, 2013

(65) Prior Publication Data
US 2015/0001858 A1      Jan. 1, 2015

(30) Foreign Application Priority Data
Feb. 20, 2012   (EP) ..................... 12156265

(51) Int. Cl.
*B60R 22/00*   (2006.01)
*F02N 11/08*   (2006.01)
(Continued)

(52) U.S. Cl.
CPC ........... *F02N 11/0862* (2013.01); *B60R 16/03* (2013.01); *H02J 7/0036* (2013.01); *F02N 11/087* (2013.01);
(Continued)

(58) Field of Classification Search
CPC ...... B60R 16/03; F02N 11/0862; H02J 7/0036
(Continued)

(56) References Cited

U.S. PATENT DOCUMENTS 5,907,194 A * 5/1999 Schenk ................... H02P 9/307
                                                                    180/65.1
6,308,674 B1   10/2001 Ruehle et al.
(Continued)

FOREIGN PATENT DOCUMENTS

DE    10 2008 001 332 A1   10/2009
DE    10 2009 047 635 A1    2/2011
(Continued)

OTHER PUBLICATIONS

International Search Report, PCT/EP2013/052832, May 6, 2013, 3 pgs.

*Primary Examiner* — Jared Fureman
*Assistant Examiner* — Alfonso Perez Borroto
(74) *Attorney, Agent, or Firm* — Volpe and Koenig, P.C.

(57) ABSTRACT

Methods and apparatuses for voltage dip stabilization in a motor vehicle are described herein. The apparatus of one embodiment includes a first connection for connecting the apparatus to an energy source, in particular to a vehicle battery and a second connection for connecting the apparatus to a starting apparatus of a motor vehicle. The apparatus also includes a current-limiting module for limiting a starter current, a control unit for driving the current-limiting module, and at least one starting process detector, which is connected to the control unit, for identifying a starting process. The control unit, on the basis of a starting process signal from the starting process detector, prompts the current-limiting module to carry out a starter current-limiting measure.

20 Claims, 1 Drawing Sheet

(51) Int. Cl.
  *B60R 16/03* (2006.01)
  *H02J 7/00* (2006.01)
  *F02N 11/10* (2006.01)

(52) U.S. Cl.
  CPC ........ *F02N 11/10* (2013.01); *F02N 2011/0888* (2013.01); *F02N 2200/043* (2013.01); *F02N 2200/044* (2013.01); *F02N 2200/062* (2013.01); *F02N 2200/063* (2013.01)

(58) Field of Classification Search
  USPC ........................................ 307/10.6; 290/38 R
  See application file for complete search history.

(56) References Cited

U.S. PATENT DOCUMENTS

| | | | |
|---|---|---|---|
| 6,347,030 B1* | 2/2002 | Matsuura | H02H 7/18 307/10.6 |
| 7,336,002 B2* | 2/2008 | Kato et al. | 307/10.6 |
| 7,432,613 B2* | 10/2008 | Jabaji et al. | 307/10.6 |
| 2007/0018615 A1* | 1/2007 | Graf | G01R 31/3648 320/160 |
| 2012/0032453 A1* | 2/2012 | Nakamura | 290/38 R |
| 2012/0060786 A1* | 3/2012 | Okada et al. | 123/179.5 |
| 2012/0075763 A1* | 3/2012 | Sieber | F02N 11/0862 361/93.9 |
| 2012/0158274 A1 | 6/2012 | Ge et al. | |
| 2012/0186551 A1 | 7/2012 | Rentschler et al. | |
| 2012/0200093 A1* | 8/2012 | Venkatasubramaniam et al. | 290/38 R |
| 2013/0066541 A1 | 3/2013 | Schueler et al. | |

FOREIGN PATENT DOCUMENTS

| | | |
|---|---|---|
| EP | 1 883 154 A1 | 1/2008 |
| WO | 2010/149416 A1 | 12/2010 |
| WO | 2011/015402 A1 | 2/2011 |
| WO | WO 2011018275 A1 * | 2/2011 |
| WO | 2011/120796 A1 | 10/2011 |

* cited by examiner

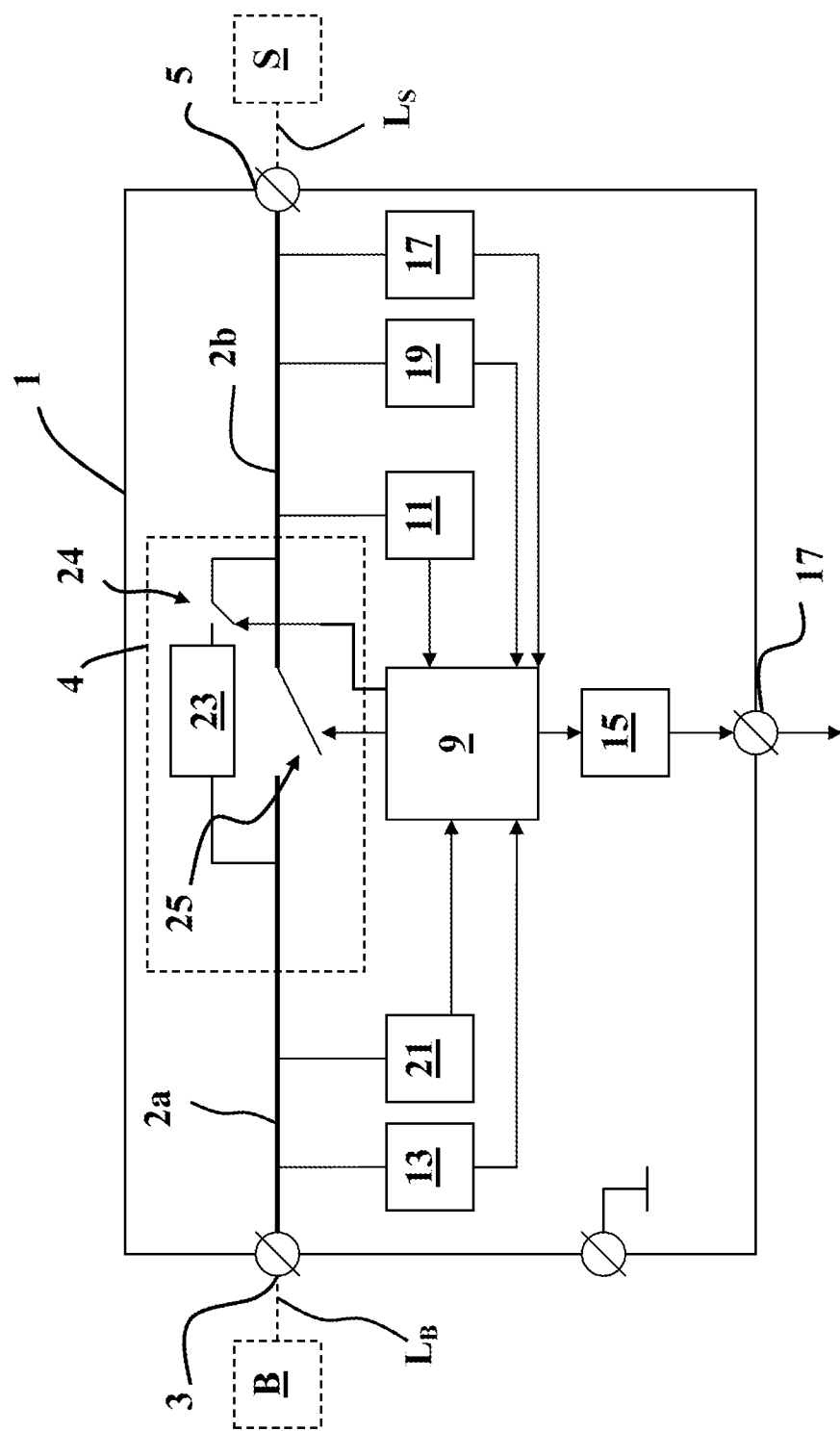

APPARATUS FOR VOLTAGE DIP STABILIZATION IN A MOTOR VEHICLE

FIELD OF INVENTION

The invention relates to an apparatus for voltage dip stabilization in a motor vehicle according to the preamble of claim 1, and also to a motor vehicle having an apparatus as per the invention according to the preamble of claim 12.

BACKGROUND

Apparatuses for stabilizing an on-board motor vehicle electrical system are known in principle. The problem faced during a starting process in a motor vehicle is, in principle, that the starter of the motor vehicle requires a high current which it draws from the vehicle battery. The high level of current drawn by the starter leads to voltage dips at the battery terminals, this leading to a voltage dip in the entire on-board electrical system. All electronic components and devices of the motor vehicle are consequently affected by a voltage dip of this kind. The depth of a voltage dip, which all components and devices which are connected to the on-board electrical system have to withstand without interference in their function and without being damaged, is defined by the manufacturers of the respective components. However, voltage dips which are even deeper than those specified by the manufacturer may occur at the battery terminals for various reasons, for example owing to a weakly charged, a damaged or an old battery. Deep voltage dips of this kind can lead to functional interference, as far as damage to the components and devices which are connected to the on-board electrical system. It is therefore necessary in every case to provide for voltage limiting at the battery terminals or to limit the starter current such that the voltage at the battery terminals cannot drop below a prespecified threshold value.

Known methods for limiting voltage can be subdivided substantially into passive methods and active methods. Passive methods for limiting voltage use resistors, which are inserted between the battery and the starter, in order to limit the starter current. Passive methods of this kind can be implemented in a particularly simple manner, but cause high-energy losses and are relatively inflexible because they have to be matched to a specific battery type and consequently have to be redefined and replaced when the battery is changed. Active methods for limiting voltage usually use pulse-width modulation (PWM) in combination with resistors, semiconductors and/or other components.

Irrespective of the type of voltage dip-limiting method, a voltage dip-limiting measure is only introduced in the case of the known apparatuses when a voltage dip has been detected in the on-board electrical system. The apparatus which detects the voltage dip then sends a corresponding control signal to an apparatus for stabilizing the on-board motor vehicle electrical system, said apparatus consequently initiating a suitable measure for limiting the voltage dip. This measure involves, for example, limiting the starter current and/or connecting an additional energy source.

One disadvantage of the known apparatuses is therefore that a voltage dip in the on-board electrical system is actively countered only after said voltage dip is detected, that is to say only in the event of a fault. It is therefore necessary to first generate a control signal on the basis of a voltage dip in order to activate monitoring of the battery voltage and subsequently further to limit the voltage dip which has already taken place. Therefore, under certain circumstances, there may be a period of time between a voltage dip in the on-board electrical system and the activation of the voltage dip-limiting measure which may possibly already be long enough for components and devices to be damaged on account of the voltage dip.

SUMMARY

The object of the present invention is therefore to provide an apparatus for stabilizing an on-board motor vehicle electrical system during a starting process which automatically identifies a voltage dip without the need for an external control signal and immediately, that is to say without a time delay, initiates a suitable voltage-limiting measure.

BRIEF DESCRIPTION OF THE DRAWINGS

A more detailed understanding may be had from the following description, given by way of example in conjunction with the accompanying drawings wherein:

FIG. 1 is a diagram of an example voltage dip stabilization system.

DETAILED DESCRIPTION

An apparatus for stabilizing an on-board motor vehicle electrical system during a starting process having the features of claim 1 is proposed for solving the abovementioned problem.

The apparatus for voltage dip stabilization in a motor vehicle has, according to the invention, the following: a first connection for connecting the apparatus to an energy source, in particular to a vehicle battery; a second connection for connecting the apparatus to a starting apparatus of a motor vehicle; a current-limiting module for limiting a starter current; a control unit for driving the current-limiting module, and at least one starting process detector, which is connected to the control unit, for identifying a starting process, wherein the control unit, on the basis of a starting process signal from the starting process detector, prompts the current-limiting module to carry out a starter current-limiting measure.

An essential point of the invention is that a voltage-limiting measure is not first initiated when the voltage dip in the on-board electrical system has already taken place, but rather a voltage dip is avoided or at least limited to an acceptable value in advance. According to the invention, this is achieved by a detected starting process rather than a detected voltage dip triggering the voltage-limiting measure. In this way, a voltage dip in the on-board electrical system is limited from the start since the voltage at the battery terminals is stabilized at any time immediately when a starting process is detected and not only when it is too late, that is to say there is already a serious voltage dip in the on-board electrical system. A starting process is automatically identified by the starting process detector and a corresponding voltage dip-limiting measure is initiated by the control unit immediately and without a time delay. The initiated voltage dip-limiting measure limits, in particular, the starter current and/or connects an additional energy source, so that the battery terminal voltage cannot drop below a specific threshold value.

The apparatus according to the invention can advantageously be directly connected to the vehicle battery, but mounting on the starter is also feasible. Furthermore, owing to the special design of the apparatus as a compact module, only three connections are necessary since it is possible to dispense with the supply of an external control signal or an external energy supply. The apparatus therefore forms an autonomous system which comprises all necessary components for preventing a voltage dip in the on-board electrical system. Since the apparatus can be connected between the vehicle battery and the starter, a starting process can be identified automatically and immediately, that is to say without a time delay, and a corresponding countermeasure can be promptly initiated. Therefore, the vehicle electronics can be substantially protected by the present invention owing to a particularly rapid initiation of voltage dip-limiting measures (specifically before a voltage dip occurs).

In contrast to the known on-board electrical system stabilization systems, only connections for connecting the apparatus according to the invention to the battery and to the starter, and also an earth connection, are required in the case of the present invention. In contrast to this, known systems require a considerable number of cables, for example for supplying an external control signal which indicates a voltage dip in the on-board electrical system.

Furthermore, provision can be made for the apparatus for stabilizing an on-board motor vehicle electrical system to additionally have a voltage sensor for identifying the voltage level of the battery. The voltage sensor can be connected both permanently and as required and detect the respective voltage level of the vehicle battery. In particular, the voltage sensor is suitable for establishing whether the battery is at the typical voltage of a vehicle battery of approximately 11 to 14 volts (V) or whether there is a jump start with an elevated voltage of approximately up to 28 V. Furthermore, the apparatus for stabilizing an on-board motor vehicle electrical system preferably has a supply voltage generator for supplying voltage to the apparatus components. The supply voltage generator generates all of the voltages which are required for correct functioning of the apparatus according to the invention from the battery voltage. Said supply voltage generator is preferably designed such that even very deep voltage dips can be compensated for. The supply voltage generator is preferably designed as an electronic circuit which can operate both in a linear manner and in a clocked manner. It goes without saying that any other suitable circuit can be used as the supply voltage generator.

The apparatus according to the invention preferably further has a diagnosis feedback unit, which is connected to the control unit, for identifying a short-circuit and/or an interruption in the starter line. The diagnosis of the starter line can (and is usually) carried out by the control means by evaluating the voltage sensor. The diagnosis feedback unit therefore serves, as it were, to transmit the diagnosis results which are received by the control means. The diagnosis feedback unit can furthermore be designed to identify the starting process.

As indicated above, the control unit initiates a voltage dip-limiting measure immediately after a starting process is detected. As explained above, this voltage dip-limiting measure can be of a passive or active nature. Passive limiting of the starter current is achieved, in principle, by connecting a resistor, while active limiting of the starter current is actively implemented by regulating the starter current. In the event of passive output current limiting, that is to say passively limiting the starter current, a current sensor which is connected to the battery line section or to the starter line section can be provided. The measurement signals which are detected by the current sensor can then be supplied to the control unit as additional information. In the case of active limiting of the starter current however, a current sensor of this kind is necessarily required in order to allow active regulation of the starter current or of the output current. If passive regulation of the output or starter current is provided, it may be sufficient to arrange a resistor for limiting the starter current between the first connection and the second connection of the apparatus according to the invention in a switchable manner. When the voltage sensor detects a starting process, the control unit can directly connect the resistor between the first and the second connection and in this way limit the current which is claimed by the starter (starter current).

A motor vehicle having an apparatus according to the invention for stabilizing an on-board motor vehicle electrical system during a starting process is also proposed according to claim 12 in order to achieve the abovementioned object. In the case of a motor vehicle of this kind, provision is preferably made for the apparatus to be connected between the vehicle battery and the starter apparatus.

The invention will be explained in greater detail below with reference to the single FIGURE.

The FIGURE shows a schematic circuit diagram of an apparatus 1 for stabilizing an on-board motor vehicle electrical system during a starting process according to the invention. Said apparatus has a first connection 3 which can be connected or is connected to an energy source and, in particular, to the vehicle battery B of a motor vehicle via a line $L_B$. Furthermore, the apparatus 1 has a second connection 5 for connecting the apparatus 1 to a starter or to a starting apparatus S of the motor vehicle via a line $L_S$. The vehicle battery B feeds both the starter S and also other components and devices of the on-board motor vehicle electrical system. A battery line section 2a of the apparatus 1 is connected to the first connection 3, while a starter line section 2b of the apparatus 1 is connected to the second connection 5. The battery line section 2a and the starter line section 2b are connected to one another via a current-limiting module 4 which is therefore connected in series between the first connection 3 and the second connection 5.

The apparatus 1 can be designed as a compact and separate unit which is accommodated in a housing and which can be arranged, for example, on a printed circuit board (PCB). The apparatus 1 can then be connected to the battery B and to the starter S by means of the connections 3 and 5 via the lines $L_B$ and $L_S$. The apparatus 1 can, in principle, be arranged anywhere in the motor vehicle. By way of example, it is feasible to accommodate the said apparatus in the boot, for example if the motor vehicle battery is located there. The apparatus 1 can be fitted directly to the battery B, but it is also feasible for the said apparatus to be fixedly mounted on the starter S. The housing of the apparatus 1 can be formed at least partially from plastic. Since the apparatus 1 temporarily carries high currents, a suitable cooling apparatus, in particular in the form of a thermally conducting mass, in particular a metal plate or the like, is provided.

According to the invention, the apparatus 1 has a starting process detector 17 which detects a starting process, in particular by detecting the voltage or the current in the apparatus 1, or in some other way. To this end, the starting process detector 17 is connected to the starter line section 2b (as shown in the FIGURE) or, as an alternative or else in addition, to the battery line section 2a of the apparatus 1. The starting process detector 17 therefore detects, for example, the current flowing across the starter line section 2b and/or across the battery line section 2a or corresponding voltages in order to detect a starting process. The starting process detector 17 is connected to a control unit 9 and indicates a starting process to said control unit. The control unit 9 in turn interacts with the current-limiting module 4, so that the current-limiting module 4 is activated by the control unit 9 in the event of a starting process which is detected by the starting process detector 17.

The apparatus 1 can furthermore have additional circuit elements, for example a voltage sensor 11, a current sensor 19 and a diagnosis feedback unit 15. The voltage sensor 11 and the current sensor 19 are connected at one end to the starter line section 2b (as shown in the FIGURE) or, alternatively, to the battery line section 2a and are connected at the other end to the control unit 9, and fulfil various auxiliary functions. For example, the voltage sensor 11 can be designed as a simple voltage divider, in particular also such that it can be connected. Provision can therefore be made for not only the voltage sensor 11 to supply a signal to the control unit 9, but provision can also be made for the control unit 9 to drive the voltage sensor 11 in order to connect additional switching elements such as transistors, in particular MOSFETs, or the like. The control unit 9 can furthermore evaluate the voltage sensor 11 and therefore serves to diagnose the electrical connection between the battery and the starter in the apparatus 1. The diagnosis result is preferably transmitted to the diagnosis feedback unit 15 which is explained further below. The current sensor 19 is required in particular when the starter current is intended to be actively limited by corresponding regulation. Regulation is performed by the control unit 9. If passive limiting of the starter current is provided, the current sensor can nevertheless be provided in order to supply additional information to the control unit 9.

Furthermore, the apparatus 1 can further have a second voltage sensor 21, which is connected between the first connection 3 and the control unit 9, at the input end. The voltage sensor 21 at the input of the apparatus 1 supplies information to the control unit 9 which allows a conclusion to be drawn as to whether a conventional car battery with a voltage range of from 11 to 14 volts or a jump start of up to 28 volts is present. Since voltage values during the jump start are defined differently, these can even exceed a voltage value of 30 V. Depending on the battery voltage, different measures can then be initiated by the control unit 9 in order to avoid a voltage dip in the on-board electrical system.

The apparatus 1 further comprises a supply voltage generator 13 which supplies all components of the apparatus 1 with the required voltage. In this case, the supply voltage generator 13 is designed such that it can also compensate for a deep voltage dip at the terminals of the vehicle battery B and can therefore supply the components of the apparatus 1 with the required voltage in a reliable manner at any time. The supply voltage generator 13 therefore forms an internal energy source or an internal energy converter which supplies energy to the apparatus 1, and in particular to the starting process detector 17, to the control unit 9 and to the current-limiting module 4, so that the system can function independently of external components.

The apparatus 1 can furthermore have the diagnosis feedback unit 15 which serves as an interface for transmitting the diagnosis results from the control unit 9 to an external device. The diagnosis feedback unit 15 therefore serves as an interface via which fault information can be passed to further vehicle control devices. The diagnosis feedback unit 15 is connected to a third connection, specifically the earth connection 17, and can forward the diagnosis results from the control unit 9, in particular the identification of a short-circuit on the starter line section 2b or the battery line section 2a, an interruption in said lines and/or a starting process. The earth connection 17 can also be connected directly to the control unit 9 or to another component of the apparatus 1 if a diagnosis feedback unit 15 is not provided in an embodiment of the apparatus 1.

The control unit 9 serves, in particular, to initiate a limiting measure for limiting the voltage dip at the battery terminals, this being implemented in the shown embodiment by limiting the current which is required by the starter (also called the starter current or output current). In the FIGURE, the apparatus 1 or the current-limiting module 4 of the apparatus 1 has a resistor 23 which can be connected in series between the first connection 3 and the second connection in order to passively limit the starter current. An electronic or mechanical switching element 24 which is driven by the control unit 9 is provided for this purpose. The switching element 24 can be designed as a transistor, in particular as a MOSFET or similar switching element. The control unit comprises a control circuit and can have, in particular, a microprocessor.

A switch 25 which can be of electronic or mechanical design and which can interrupt a direct connection between the starter line section 2b and the battery line section 2a between the connections 3 and 5 is further provided. The switch 25 is also driven by the control unit 9. When the switch 25 is open and the switch 24 is closed, the current in the apparatus 1 is consequently rerouted from the battery B to the starter S via the resistor 23, so that a current flow is effectively reduced. If, in contrast, the switch 25 is closed and the switch 24 is open, current flows directly from the battery B to the starter S via the starter line section 2b and the battery line section 2a.

In the embodiment of the apparatus 1 with a current-limiting module 4 which limits the current flow by means of a resistor 23, which embodiment is shown in the FIGURE, the current sensor 19 is not absolutely necessary. However, the measurement data which is detected by it can be forwarded to the control unit 9 as additional information and can be processed by said control unit. Secondly, as an alternative or in addition, active current regulation can be provided, in the case of which the resistor 23 does not have to be provided in the current-limiting module 4. In this case, active regulation of the starter current is performed by the control means with the aid of the current sensor 19, for example in the manner of a DC/DC conversion process.

The functioning of the apparatus 1 according to the invention will be explained in greater detail below. As soon as the starting process detector 17 detects a starting process (switching element 24 open, switch 25 closed), said starting process detector generates a corresponding signal and forwards said signal to the control unit 9. The starting process detector 17 consequently activates the control unit 9; in other words the control unit 9 is woken up by the (preferably digital) signal from the starting process detector 17. The control unit 9 then drives the current-limiting module 4 and consequently activates a passive or active current-limiting mechanism which immediately limits the current flow from the battery to the starter (switching element 24 closed, switch 25 open). As a result, the voltage dip at the battery terminals and therefore a voltage dip in the entire on-board electrical system is reliably prevented or at least limited to a specific acceptable minimum voltage value.

As stated, either a series resistor 23 can be connected for a specific time (passive limiting) or active current limiting is performed, for example by means of a DC/DC conversion process for regulating the starter current, depending on the type of current-limiting measure (passive or active) which is provided.

The apparatus 1 monitors the starter and preferably also the battery status, if a voltage sensor is provided, permanently and without the need for an external activation signal. The apparatus 1 uses the integrated starting process detector 17 to automatically, that is to say without relying on an external activation signal, identify whether a starting process is present and consequently a voltage dip in the on-board electrical system is imminent. The said apparatus then immediately begins initiating a voltage dip-limiting measure.

Control devices in motor vehicles are usually designed such that they withstand voltage dips at the battery terminals of up to 9 V and can operate correctly up to this voltage level. Although new batteries allow higher starter currents with lower voltage dips, newly developed starters require significantly more current from the vehicle battery, this being caused by the need to accelerate the starting process (during start/stop operation in city traffic). This in turn leads to deeper voltage dips at the battery terminals and therefore in the on-board electrical system. In relatively modern vehicles however, older, less voltage-resistant control devices are often also used, this maintaining the previous requirement for the depth of the voltage dip which is not to be exceeded in each case. A voltage dip at the battery terminals can preferably be limited to approximately 9 V. However, it is feasible to define this lower limit to be even lower.

The apparatus for automatically stabilizing an on-board motor vehicle electrical system according to the present invention can not only be used in start/stop systems in motor vehicles, but rather the apparatus according to the present invention also protects the on-board electronics and, moreover, also the vehicle battery in vehicles without an automatic start/stop system. Slight delays in the starting process which cannot be perceived by the driver or are difficult for the driver to perceive, can be accepted in this case.

Overall, the apparatus according to the invention for stabilizing an on-board motor vehicle electrical system allows automatic identification of the starting process in the event of a starting process and therefore allows measures for limiting a voltage dip to be initiated immediately. Therefore, an external control signal which signals a voltage dip in the on-board electrical system can be dispensed with. An imminent voltage dip can therefore be identified virtually without a time delay and can be reliably limited, so that firstly the vehicle battery and secondly the vehicle electronics are protected.

LIST OF REFERENCE SYMBOLS

1 Apparatus for stabilizing an on-board motor vehicle electrical system
2a Battery line section
2b Starter line section
3 First connection
4 Current-limiting module
5 Second connection
9 Control unit
11 Voltage sensor
13 Supply voltage generator
15 Diagnosis feedback unit
17 Earth connection
19 Current sensor
21 Voltage sensor
23 Resistor
25 Switch
B Battery
S Starter
$L_B$ Line
$L_S$ Line

The invention claimed is:

1. An apparatus for voltage dip stabilization in a motor vehicle, the apparatus comprising:
a first connection that connects the apparatus to an energy source, wherein the energy source is a vehicle battery;
a second connection that connects the apparatus to a starting apparatus of a motor vehicle;
a current-limiting module that limits a starter current, wherein the current-limiting module includes a resistor and is connected in series between the first connection and second connection;
at least one starting process detector that is connected to a control unit wherein on a condition that the at least one starting process detector identifies a starting process, the at least one starting process detector forwards a digital signal to the control unit; and
wherein the control unit, on a condition that the digital signal is received from the at least one starting process detector, prompts the current-limiting module to carry out a starter current-limiting measure, wherein the current-limiting measure includes driving a switching element to close causing current to be rerouted to the starting apparatus via the resistor of the current-limiting module.

2. The apparatus of claim 1, wherein the first connection and the second connection are connected to one another via a battery line section and a starter line section.

3. The apparatus of claim 2, wherein the battery line section is connected to the starter line section via the current-limiting module.

4. The apparatus of claim 1, further comprising:
a voltage sensor that identifies a voltage level of the vehicle battery.

5. The apparatus of claim 1, further comprising:
a supply voltage generator for supplying voltage to the apparatus.

6. The apparatus of claim 1, further comprising:
a diagnosis unit that is connected to the control unit, that identifies a short-circuit and/or an interruption in a starter line.

7. The apparatus of claim 6, wherein the diagnosis unit is connected to an earth connection.

8. The apparatus of claim 1, wherein a voltage dip-limiting measure includes passive limiting of the starter current by connecting a resistor.

9. The apparatus of claim 8, wherein that the voltage dip-limiting measure comprises limiting the starter current by active regulation of the starter current.

10. The apparatus of claim 1, wherein a voltage dip is limited to 9 volts.

11. The apparatus of claim 1, further comprising:
a current sensor that is connected to the control unit to enable limiting the starter current in a regulated manner.

12. The apparatus of claim 1, wherein a resistor for limiting the starter current is connected between the first connection and the second connection via a switching element.

13. A motor vehicle apparatus configured for stabilizing an on-board motor vehicle electrical system during a starting process, the motor vehicle comprising:
a first connection that connects the motor vehicle apparatus to an energy source, wherein the energy source is a vehicle battery;

a second connection that connects the motor vehicle apparatus to a starting apparatus;
a current-limiting module that limits a starter current, wherein the current-limiting module includes a resistor and is connected in series between the first connection and second connection;
a control unit that connects to a current sensor;
at least one starting process detector that is connected to the control unit wherein on a condition that the at least one starting process detector identifies a starting process, the at least one starting process detector forwards a digital signal to the control unit; and
wherein the control unit, on a condition that the digital signal is received from the at least one starting process detector, prompts the current-limiting module to carry out a starter current-limiting measure and regulates current flowing to the starting apparatus via DC/DC conversion based on a signal from the current sensor, wherein the current-limiting measure includes driving a switching element to close causing current to be rerouted to the starting apparatus via the resistor of the current-limiting module.

14. The motor vehicle apparatus of claim 13, wherein the motor vehicle apparatus is connected between the vehicle battery and starter apparatus.

15. The motor vehicle apparatus of claim 13, wherein the motor vehicle apparatus is fitted to the vehicle battery or to the starting apparatus.

16. A method for stabilizing an on-board motor vehicle electrical system during a starting process, the method comprising:

connecting a motor vehicle apparatus to an energy source, wherein the energy source is a vehicle battery;
connecting the motor vehicle apparatus to a starting apparatus;
on a condition that at least one starting process detector identifies a starting process, forwarding, by the at least one starting process detector, a digital signal to a control unit; and
on a condition that the digital signal is received from the at least one starting process detector, prompting, by the control unit, a current-limiting module to carry out a starter current-limiting measure, wherein the current-limiting measure includes driving a switching element to close causing current to be rerouted to the starting apparatus via a resistor in the current-limiting module.

17. The method of claim 16, further comprising:
identifying, by a voltage sensor, a voltage level of the vehicle battery.

18. The method of claim 16, further comprising:
supplying, by a supply voltage generator, voltage to the motor vehicle apparatus.

19. The method of claim 16, further comprising:
identifying, by a diagnosis unit, a short-circuit and/or an interruption in a starter line.

20. The method of claim 16, further comprising:
limiting, by a current sensor, the starter current in a regulated manner.

* * * * *